(12) United States Patent
Ha et al.

(10) Patent No.: US 8,712,447 B2
(45) Date of Patent: Apr. 29, 2014

(54) METHOD OF TRANSMITTING AND RECEIVING A PAGING MESSAGE IN A MOBILE COMMUNICATION SYSTEM

(75) Inventors: Sung Woong Ha, Anyang-Si (KR); Ki Seon Ryu, Anyang-Si (KR); Jeong Ki Kim, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 828 days.

(21) Appl. No.: 12/348,107

(22) Filed: Jan. 2, 2009

(65) Prior Publication Data

US 2009/0209273 A1  Aug. 20, 2009

(30) Foreign Application Priority Data

Jan. 3, 2008  (KR) ........................ 10-2008-0000730

(51) Int. Cl.
*H04W 68/00* (2009.01)
*H04B 7/00* (2006.01)

(52) U.S. Cl.
USPC ........................... 455/458; 455/515; 370/311

(58) Field of Classification Search
USPC .................................. 455/458, 515; 370/311
See application file for complete search history.

(56) References Cited

U.S. PATENT DOCUMENTS

| | | | |
|---|---|---|---|
| 6,950,684 B2 | 9/2005 | Goldberg | |
| 7,844,265 B2 * | 11/2010 | Kuchibhotla et al. | 455/423 |
| 2001/0015963 A1 * | 8/2001 | Tuomainen et al. | 370/311 |
| 2005/0157667 A1 | 7/2005 | Goldberg | |
| 2005/0254444 A1 | 11/2005 | Meier et al. | |
| 2007/0070998 A1 | 3/2007 | Sethuram et al. | |
| 2008/0254814 A1 * | 10/2008 | Harris et al. | 455/458 |
| 2010/0214969 A1 * | 8/2010 | Lamm et al. | 370/311 |

FOREIGN PATENT DOCUMENTS

| | | |
|---|---|---|
| CN | 1947357 A | 4/2007 |
| CN | 101064681 A | 10/2007 |

* cited by examiner

*Primary Examiner* — Marisol Figueroa
(74) *Attorney, Agent, or Firm* — Birch, Stewart, Kolasch & Birch, LLP (57) ABSTRACT

A method of transmitting and receiving a paging message in a mobile communication system is disclosed, by which the power saving effect can be enhanced in a manner of minimizing unnecessary wake-up, decoding and demodulation of a terminal by informing the terminal of a location of a frame to receive before a base station sends a paging message. An embodiment of the present invention comprises transmitting a signal including location information of the paging message for a specific terminal between paging listening intervals to the terminal and transmitting the paging message to the terminal for the paging listening interval.

3 Claims, 8 Drawing Sheets

METHOD OF TRANSMITTING AND RECEIVING A PAGING MESSAGE IN A MOBILE COMMUNICATION SYSTEM

Pursuant to 35 U.S.C. §119(a), this application claims the benefit of earlier filing data and right of priority to the Korean Patent Application No. 10-2008-00730, filed on Jan. 3, 2008, which is hereby incorporated by reference as if fully set forth herein.

BACKGROUND OF THE INVENTION

1. Field of the Invention

The present invention relates to paging message transmission and reception, and more particularly, to a method of transmitting and receiving a paging message in a mobile communication system. Although the present invention is suitable for a wide scope of applications, it is particularly suitable for enhancing power efficiency of a terminal that receives a paging message by waking up in a paging listening interval.

2. Discussion of the Related Art

Generally, a terminal in an idle mode which does not have a traffic channel in a mobile communication system checks a presence or non-presence of paging in a manner of receiving a paging message with a predetermined interval. In doing so, a network has to be aware of a location of the terminal to transmit a paging message to the corresponding terminal in the idle mode. Yet, the tracking of the location of the idle-mode terminal by a cell unit is not preferable in that a new registration message should be transmitted each time the terminal moves away into another cell.

Due to the above reason, a plurality of cells are generally grouped together to be used a location tracking unit of a terminal in the idle mode. In the following description, an area corresponding to a unit of location tracking of an idle-mode terminal is named a paging area. In UMTS (Universal Mobile Telecommunication System), the paging area can be called a routing area.

In case that a paging area is changed, an idle-mode terminal sends a message for updating a location to a network. In case of attempting to page the idle-mode terminal, the network broadcasts a paging message carrying an identifier of the terminal to all cells belonging to a paging area reported by the idle-mode terminal most lately.

A time interval between two consecutive wake-up periods is called a paging period. If a paging period is raised to reduce power consumption of a terminal, a paging standby duration is increased. This is not suitable for newly generated services such as push-to-talk and the like. The newly generated services can request a very short paging standby duration, e.g., a period equal to or smaller than one second to provide a user with a feeling of an instant response for example. Preferably, a paging period for minimizing a call setup time in a push-to-talk system may amount to about 100 ms.

In the following description, explained is an operation of a terminal in the idle mode during a paging listening interval for receiving a paging message of a broadband wireless access system.

First of all, since a terminal in the idle mode is unable to receive a paging message from a base station, the terminal wakes up for a paging listening interval to receive a paging message. Hence, in case that the terminal receives a paging message including its MAC address from a base station during a paging listening interval, the terminal receives information included in the paging message and is then able to perform a corresponding operation such as a network entry and the like.

Figure 1:
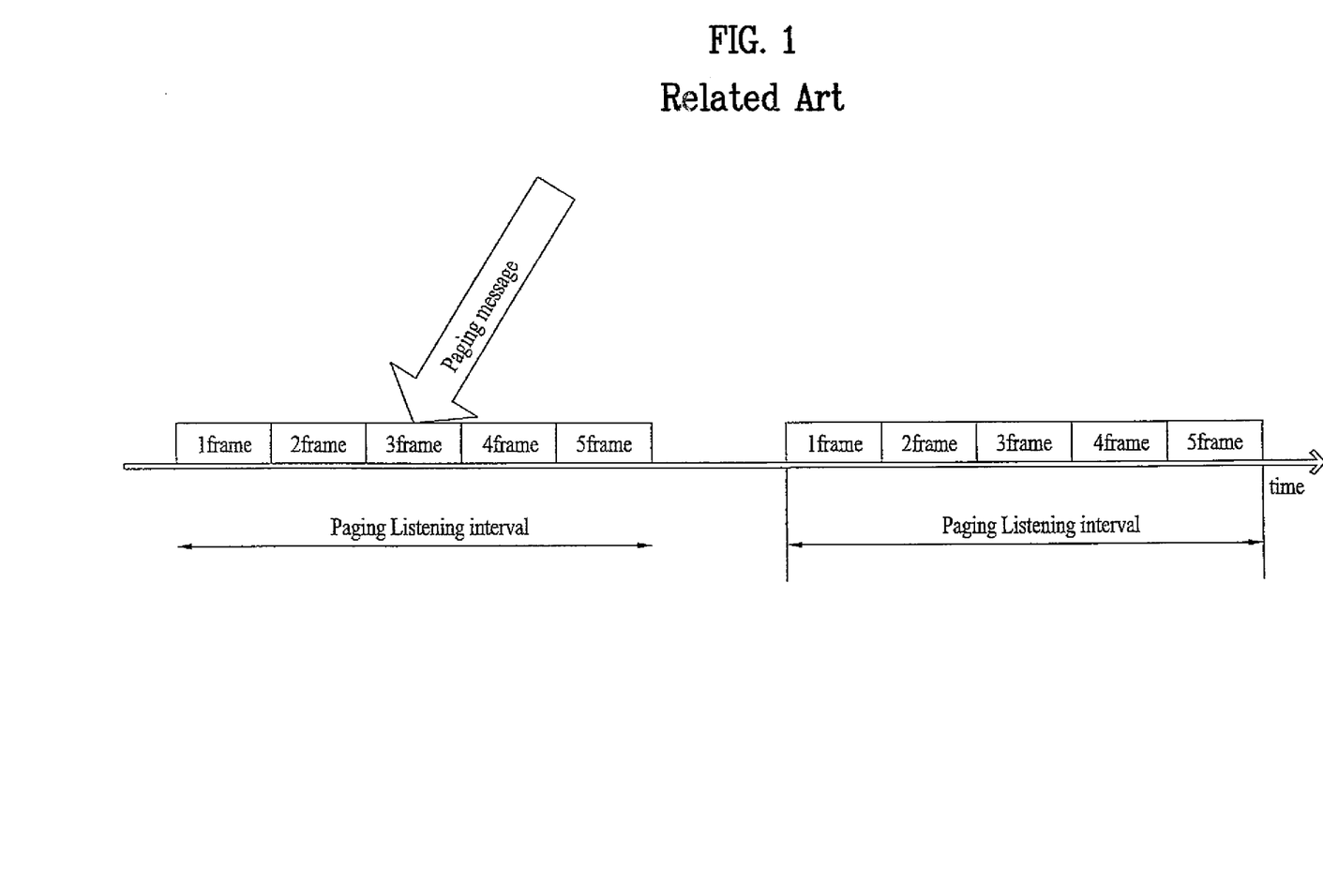
FIG. 1 is a diagram for a paging message transmitting and receiving process on a time axis according to a related art.

FIG. 1 is a diagram for a paging message transmitting and receiving process on a time axis according to a related art. In FIG. 1, a paging listening interval includes five frames for example. Assume that a paging message is received in the third frame.

Since a terminal is unable to know an exact frame on which a paging message is transmitted among five frames, it has to check all the frames. As a paging message including a MAC address of the terminal is received on the third frame) the terminal check the frames up to the third and then takes a corresponding action according to paging information included in the third frame.

If a paging message including the MAC address of the terminal does not exist in any of the five frames, the terminal enters an idle mode again without taking any action as soon as the five frames end. The terminal then performs the above operation repeatedly in a next paging listening interval.

However, according to the above-described method, a terminal in the idle mode has to check all frames within a paging listening interval even if a MAC address of a terminal is not included. Therefore, the power saving effect is degraded.

SUMMARY OF THE INVENTION

Accordingly, the present invention is directed to a method of transmitting and receiving a paging message in a mobile communication system that substantially obviates one or more problems due to limitations and disadvantages of the related art.

An object of the present invention is to provide a method of transmitting a paging message, by which power saving effect can be enhanced in a manner of minimizing unnecessary wake-up, decoding and demodulation of a terminal by informing the terminal of a location of a frame to receive before a base station sends a paging message.

Another object of the present invention is to provide a method of receiving a paging message, by which the power saving effect can be enhanced in a manner of minimizing unnecessary wake-up, decoding and demodulation of a terminal by checking information on a location of a frame transmitted by a base station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a paging message, which is transmitted to a terminal that wakes up a paging listening interval, according to the present invention comprises transmitting a signal including location information of the paging message for a specific terminal between paging listening intervals to the terminal and transmitting the paging message to the terminal for the paging listening interval.

Preferably, the signal includes a MAC address of the terminal and a location of a frame to be received by the terminal for receiving the paging message.

Preferably, the step of transmitting the signal to the terminal includes the step of transmitting the location information for a TTG using signal modulation.

In another aspect of the present invention, a method of transmitting a paging message which is transmitted to a terminal that wakes up for a paging listening interval, comprises transmitting a signal including location information of the paging message for a specific terminal at a start point of a paging listening interval to the terminal using a TTG and transmitting the paging message to the terminal for the paging listening interval.

Preferably, the signal includes a MAC address of the terminal and a location of a frame to be received by the terminal for receiving the paging message.

Preferably, the signal transmitting step includes the step of transmitting the location information using signal modulation.

In another aspect of the present invention, a method of transmitting a paging message which is transmitted to a terminal that wakes up during a paging listening interval, comprises transmitting an additional frame including location information of the paging message for a specific terminal between paging listening intervals and transmitting the paging message to the terminal for the paging listening interval.

Preferably, the location information includes a location of a frame to be received by the terminal for receiving the paging message.

In another aspect of the present invention, a method of receiving a paging message of a base station by waking up during a paging listening interval comprises receiving a signal including location information of the paging message for a specific terminal by waking up between paging listening intervals, entering an idle mode, and receiving the paging message by waking up at a location indicated by the signal in the paging listening interval.

Preferably, the signal includes a MAC address of the terminal and a location of a frame to be received by the terminal for receiving the paging message.

Preferably, the step of entering the idle mode includes the steps of checking the location indicated by the signal by demodulating the signal and, if the location indicated by the signal is an adjacent location, maintaining a wake-up status.

Preferably, the step of entering the idle mode includes the step of receiving the signal at a timing point for the terminal to wake up to match synchronization with the base station.

Preferably, the signal is transmitted for a TTG.

In another aspect of the present invention, a method of receiving a paging message of a base station by waking up for a paging listening interval comprises receiving a signal including location information of the paging message for a specific terminal for TTG of a start point of a paging listening interval, entering an idle mode, and receiving the paging message by waking up at a location indicated by the signal in the paging listening interval.

Preferably, the signal includes a MAC address of the terminal and a location of a frame to be received by the terminal for receiving the paging message.

Preferably, the step of entering the idle mode includes the steps of checking the location indicated by the signal by demodulating the signal and, if the location indicated by the signal is an adjacent location, maintaining a wake-up status.

In a further aspect of the present invention, a method of receiving a paging message of a base station by waking up during a paging listening interval comprises receiving an additional frame including location information of the paging message for a specific terminal by waking up between paging listening intervals, entering an idle mode, and receiving the paging message by waking up at a location indicated by the additional frame in the paging listening interval.

Preferably, the location information includes a location of a frame to be received by the terminal for receiving the paging message.

Accordingly, the power saving effect can be maximized in a manner of minimizing unnecessary wake-up, decoding and demodulation of a terminal by informing the terminal of a location of a frame to receive before a base station sends a paging message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a presence or non-presence of wake-up is informed to a terminal in an idle mode before a paging listening interval. If the terminal is informed of a presence or non-presence of wake-up in a form of a signal for a TTG (transmit-to-receive transition gap), it is able to inform the terminal of the information without using additional resources.

Hence, in one embodiment of the present invention a base station informs a terminal of a MAC address of the terminal which is to wake up in a signal form for TTG. Having received its MAC address, the terminal wakes up for a paging listening interval and then maintains the wake-up status to receive paging information. On the contrary, a terminal which does not receive its MAC address included in the signal is able to realize that there is no paging message including its MAC address before a paging listening interval. If so, the terminal enters an idle mode to save its power instead of waking up for the paging listening interval.

If there exists a paging message containing a MAC address of a terminal, the terminal keeps waking up for a paging listening interval. In case that a terminal receives a frame carrying a paging message including its MAC address, the terminal takes actions according to information included in the paging message.

Since the terminal is unable to know which frame carries the paging message containing its MAC address, the terminal should keep waking up during the paging listening interval. If a frame carrying the MAC address of the terminal is located at a front part of the paging message, it does not matter considerably. However, if the frame carrying the MAC address of the terminal is located at a rear part of the paging message, the terminal should keep waking up to perform decoding and demodulation on unnecessary frames until receiving a frame carrying its MAC address. Such an operation reduces the power saving effect. Therefore, it is necessary to provide a method for a base station to accurately inform a terminal of a location or time or the like of a frame to receive.

In the following description, assume a case that a base station sends a paging message with five frames every paging listening period.

Figure 2:
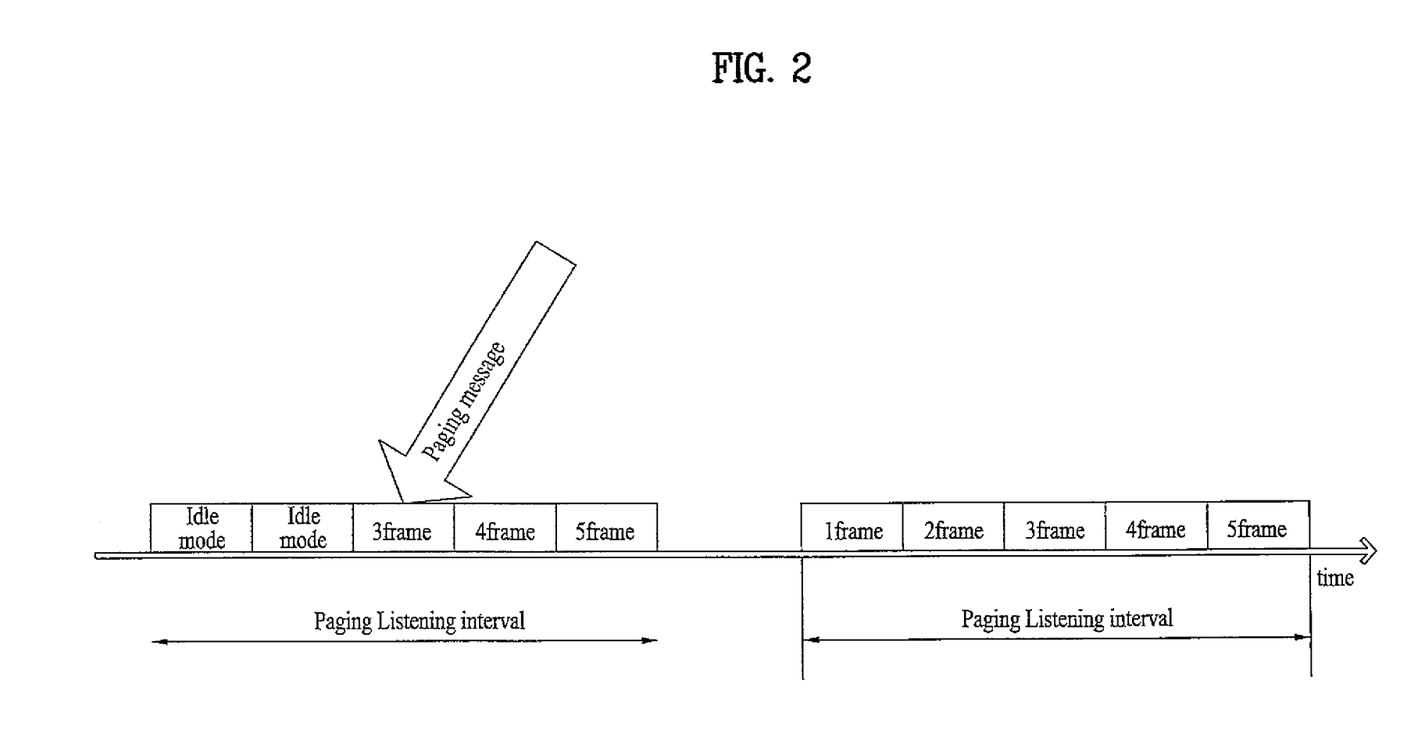
FIG. 2 is a diagram for a paging message transmitting and receiving process on a time axis according to one embodiment of the present invention.

FIG. 2 is a diagram for a paging message transmitting and receiving process on a time axis according to one embodiment of the present invention.

Referring to FIG. 2, a base station informs a terminal of a location of a frame carrying a MAC address of the terminal to which a paging message shall be sent before a paging listening interval. If information indicating that a frame to be received by the terminal is a third frame is transmitted to the terminal in advance, the terminal wakes up for the third frame without waking up for first and second frames and then receives the third frame. In particular, since the terminal can receive a paging message containing the MAC address of the corresponding terminal for the third frame, the terminal maintains an idle mode before the third frame, so that the power saving effect can be increased by raising a period of the idle mode status of the terminal.

Figure 3:
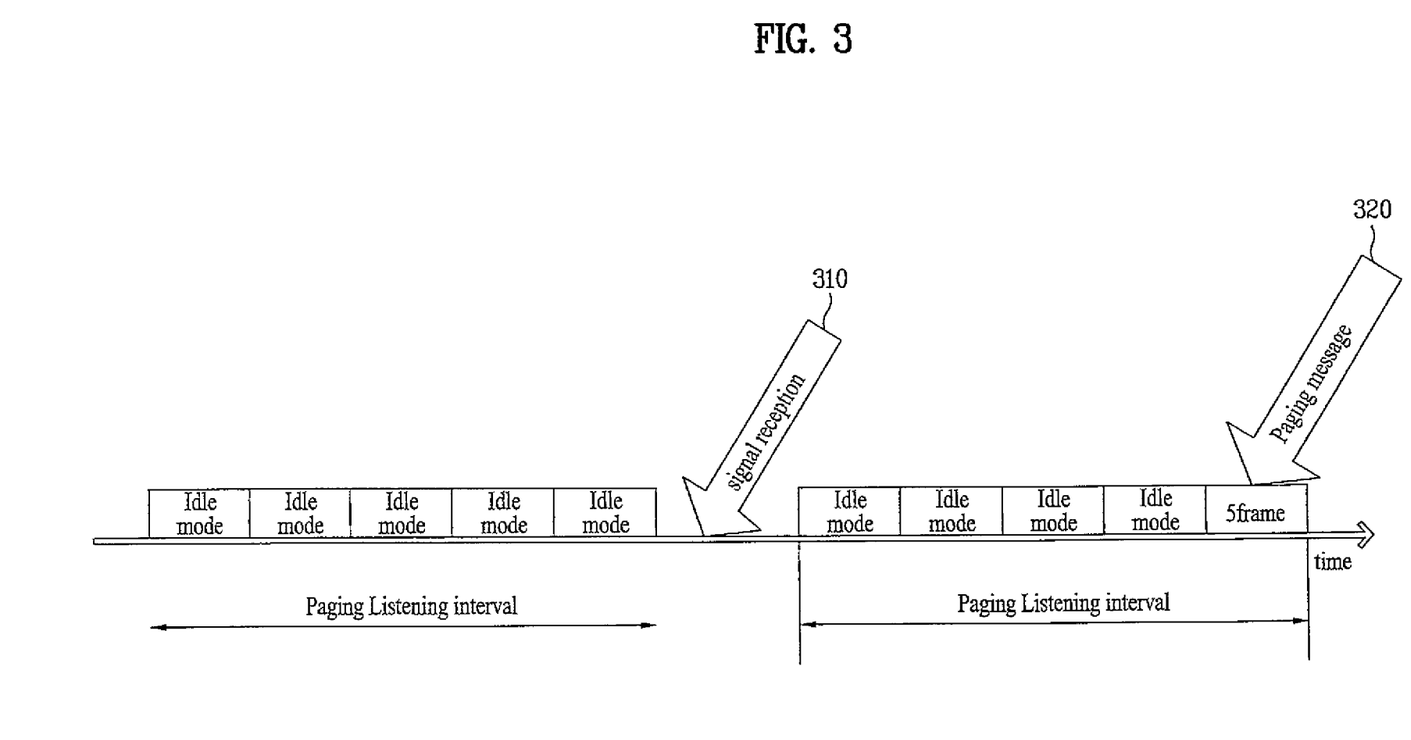
FIG. 3 is a diagram for a paging message transmitting and receiving process on a time axis according to one embodiment of the present invention.

FIG. 3 is a diagram for a paging message transmitting and receiving process on a time axis according to one embodiment of the present invention.

In FIG. 3, a base station transmits a signal to a terminal for a time period between paging listening intervals. The signal includes location information of a paging message for the terminal. Moreover, the signal may be in a form modulated by a signal modulation scheme. Particularly, the location information includes a location of a frame during which the terminal is to receive the paging message. Preferably, the base station is able to transmit the signal for a TTG.

Meanwhile, the location information may indicate an extent of how much a frame to be received within a paging listening interval is delayed. It is able to represent the location information using a plurality of bits. For instance, the location information '101' may mean a fifth frame in a paging listening interval. Alternatively, the location information may be time information for which a frame to be received is transmitted.

Referring to FIG. 3, a terminal receives a signal from a base station between paging listening intervals [310] and then checks that a MAC address of the terminal is included in a fifth frame. The terminal can maintain the current idle mode for first to fourth frames. The terminal wakes up for the fifth frame and then receives a paging message [320].

Meanwhile, in case that the terminal wakes up to receive the above-mentioned signal between the paging listening intervals, a timing point of the wake-up can be set to a timing point at which the terminal wakes up to match synchronization with the base station.

Figure 4:
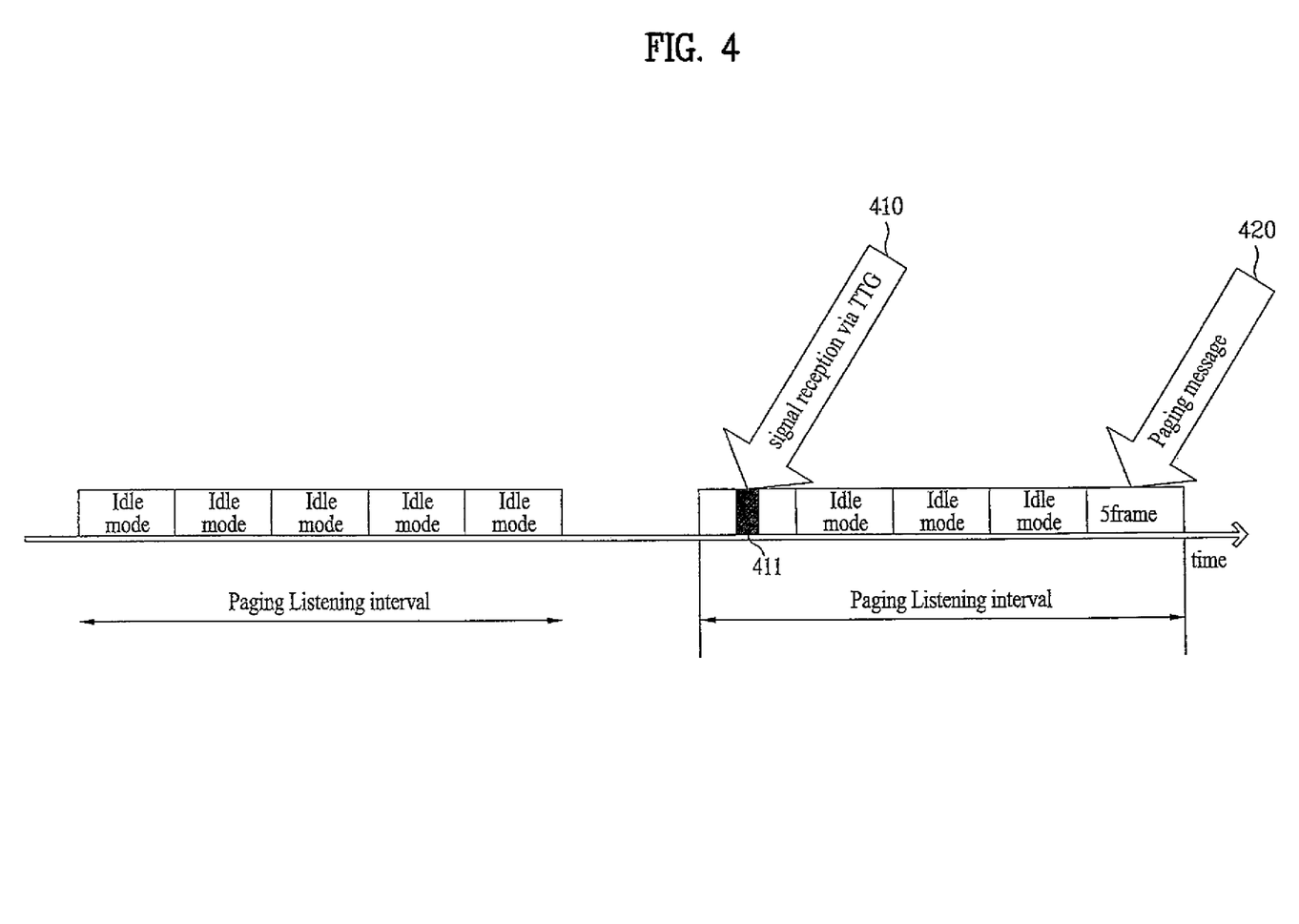
FIG. 4 is a diagram for a paging message transmitting and receiving process on a time axis according to another embodiment of the present invention.

FIG. 4 is a diagram for a paging message transmitting and receiving process on a time axis according to another embodiment of the present invention.

In FIG. 4, a base station may transmit a signal to a terminal for a TTG 411 of a first frame within a paging listening interval. In this case, as mentioned in the foregoing description, the signal includes location information of a paging message for a specific terminal. Moreover, the signal may be in a form modulated by a random signal modulation scheme. Particularly, the location information includes a location of a frame during which the terminal receives the paging message.

Referring to FIG. 4, the terminal receives a signal from the base station for the TTO 411 of a first frame within a paging listening interval [410] and then realizes that a MAC address of the terminal is included in a fifth frame. The terminal correspondingly enters an idle mode and then maintains the idle mode for first to fourth frames. The terminal wakes up during the fifth frame and then receives a paging message [420].

Figure 5:
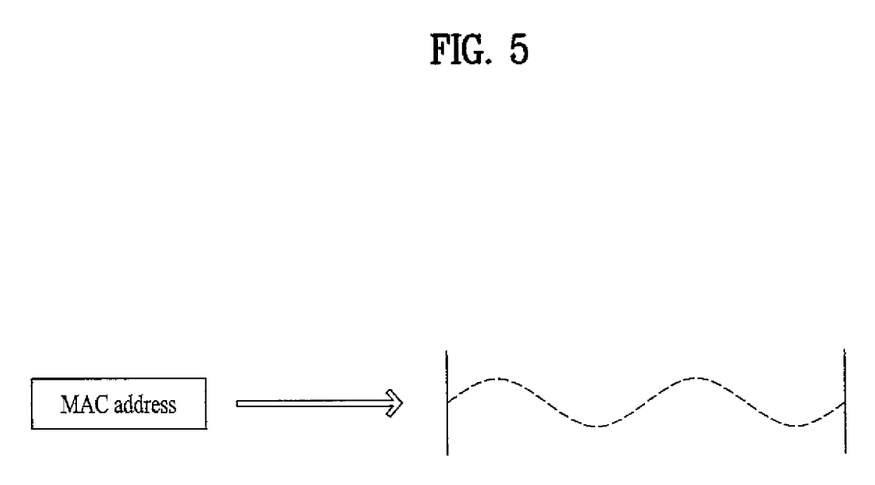
FIG. 5 is a diagram of an example for transmitting a MAC address of a terminal in a signal form.

FIG. 5 is a diagram of an example for transmitting a MAC address of a terminal in a signal form.

Referring to FIG. 5, as mentioned in the foregoing description, since a terminal is unable to accurately know a location of a frame to receive, the terminal has to check unnecessary frames as well according to the related art. In order that the terminal is able to maximize power efficiency, a base station needs to transmit location information of a frame to be received by the terminal in a form of a signal.

Figure 6:
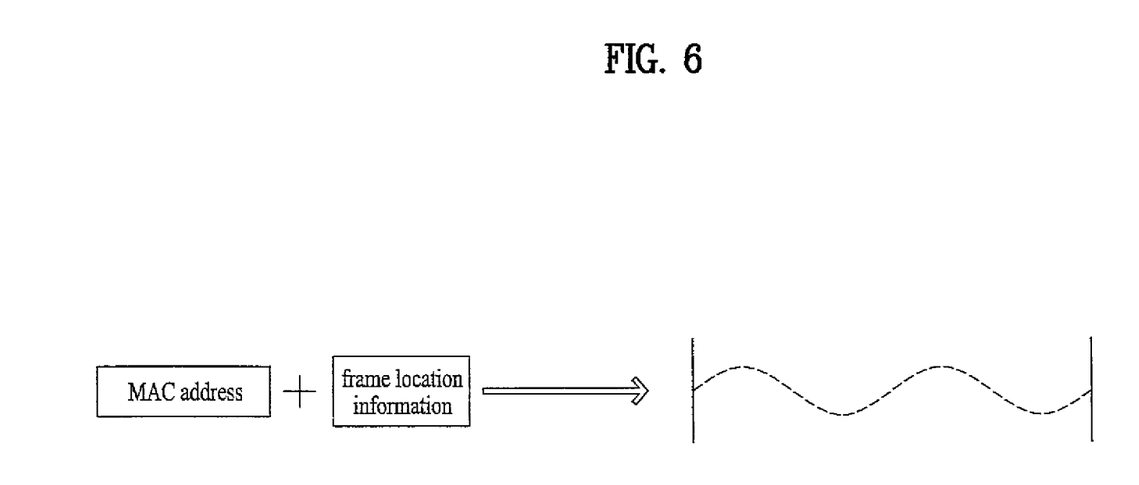
FIG. 6 is a diagram of an example for a base station to add location information of a frame to be received by a terminal to the signal shown in FIG. 5 while transmitting the signal in FIG. 3 or FIG. 4.

FIG. 6 is a diagram of an example for a base station to add location information of a frame to be received by a terminal to the signal shown in FIG. 5.

Referring to FIG. 6, a base station transmits a signal to a terminal for a TTG in a manner that information indicating a location of a frame to be received by the terminal is included in the signal. In this case, as the transmission is performed in a form of a signal, occurrence of an additional overhead can be avoided. In particular, the signal transmitted by the base station needs not to increase a previous size of the message.

The terminal receives the signal of the base station prior to a paging listening interval or for a most front part of a paging listening interval. In case that a MAC address of the terminal is not included in the received signal, the terminal instantly enters an idle mode. On the contrary, in case a MAC address of the terminal is included in the received signal, the terminal obtains location information of a frame to be received in the signal. The terminal keeps the idle mode until a transmission timing point of the frame based on the location information. The terminal wakes up at a location indicated by the location information and then receives a paging message.

Figure 7:
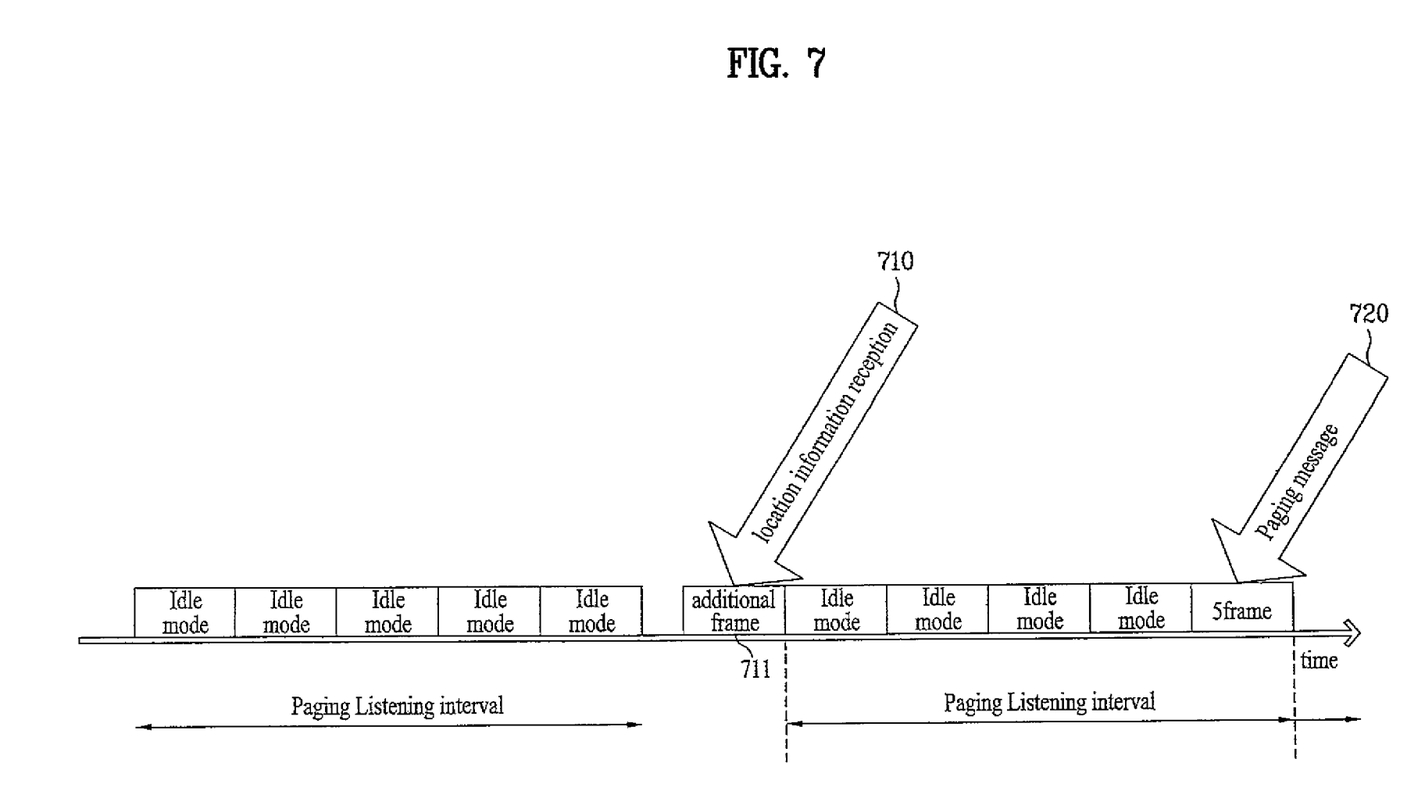
FIG. 7 is a diagram for a paging message transmitting and receiving process on a time axis according to a further embodiment of the present invention.

FIG. 7 is a diagram for a paging message transmitting and receiving process on a time axis according to a further embodiment of the present invention.

In FIG. 7, a base station transmits an additional frame 711 to a terminal between paging listening intervals. In this case, the additional frame includes location information of a paging message for a specific terminal. Particularly, the location information includes a location of a frame during which the terminal is to receive the paging message.

Referring to FIG. 7, the terminal receives the additional frame 711 [710] and then realizes that a MAC address of the terminal is included in a fifth frame. The terminal correspondingly enters an idle mode and then keeps the idle mode for first to fourth frames. The terminal wakes up for the fifth frame and then receives a paging message [720].

Figure 8:
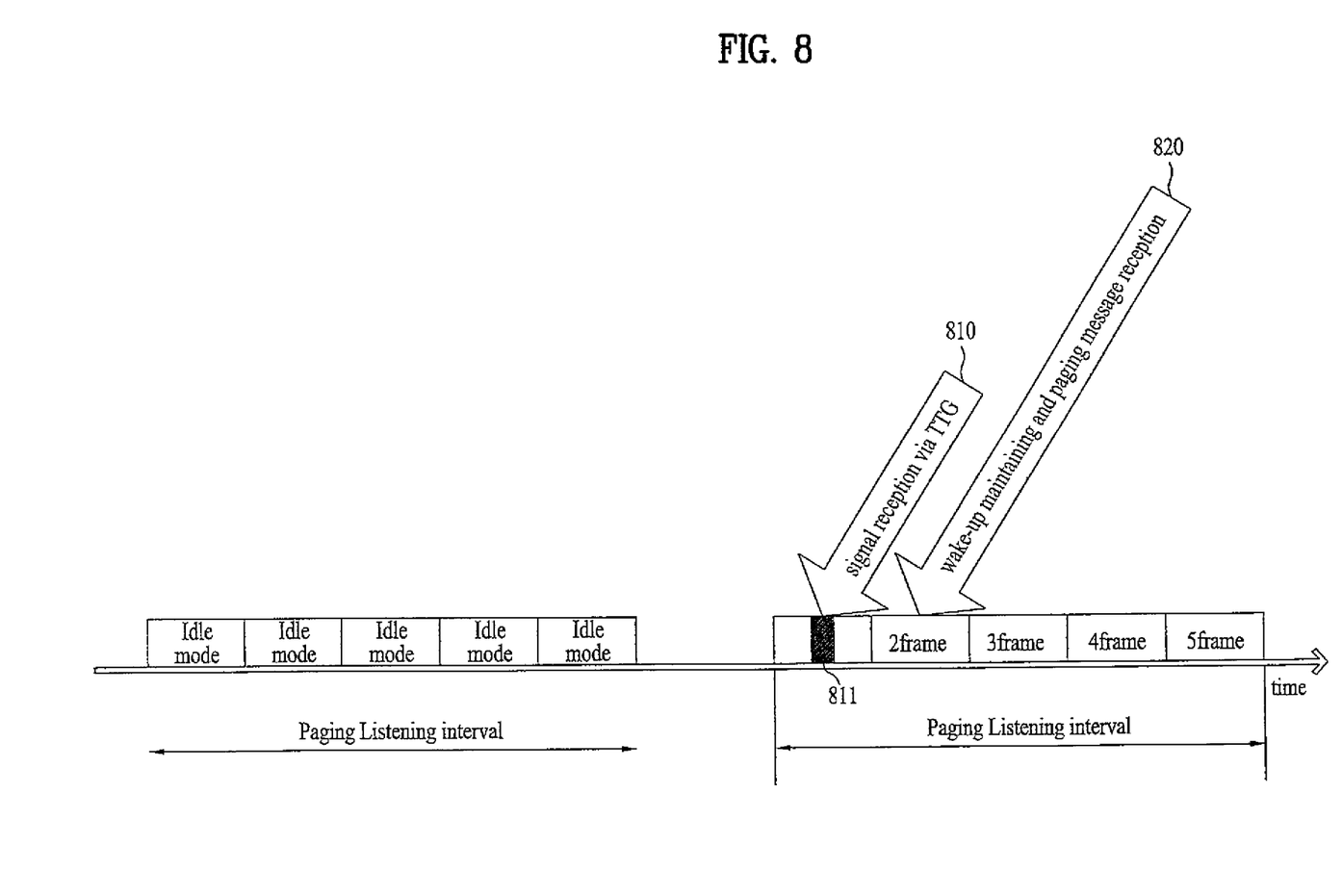
FIG. 8 is a diagram for a case that a terminal maintains wake-up in transmitting and receiving a paging message according to FIG. 4.

FIG. 8 is a diagram for a case that a terminal maintains a wake-up state while transmitting and receiving a paging message according to FIG. 4.

In FIG. 8, a base station transmits a signal to a terminal for a TTG 811 of a first frame within a paging listening interval. In this case, as mentioned in the foregoing description, the signal includes location information of a paging message for a specific terminal.

Referring to FIG. 8, the terminal receives the signal from the base station for the TTG 811 of the first frame within the paging listening interval [810] and then realizes that a MAC address of the terminal is included in a second frame. Preferably, in case that a frame to be received by the terminal is directly adjacent to a timing point of receiving a signal or an additional frame, the terminal may not enter an idle mode. The terminal receives a paging message for the second frame while maintaining a wake-up status [820].

Accordingly, the present invention relates to a method of enhancing power efficiency of a terminal that receives a paging message by waking up for a paging listening interval, thereby being applicable to such a mobile communication relevant apparatus as a terminal, a base station and the like as well as to corresponding algorithms.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a paging message of a base station by waking up during a paging listening interval, the method comprising:

receiving, by a terminal in an idle mode, a signal at an additional frame between a first paging listening interval and a second paging listening interval, the signal including a MAC address of the terminal and location information of a frame of the second paging listening interval where the paging message is received, wherein the second paging listening interval is a next paging listening interval after the first paging listening interval, and wherein the location information indicates a number of frames within the second paging listening interval until the frame of the paging message is to be received; and receiving the paging message by waking up at the frame in the second paging listening interval indicated by the signal, wherein the terminal maintains the idle mode prior to receiving the frame in the second paging listening interval indicated by the signal.

2. The method of claim 1, further comprising:

checking the frame indicated by the signal after demodulating the signal; and maintaining a wake-up status in case that the frame indicated by the signal is a second frame.

3. The method of claim 1, wherein the signal is transmitted during a TTG (Transmit-to-receive Transition Gap) of the additional frame.

* * * * *